United States Patent
Luo

(10) Patent No.: US 9,608,560 B2
(45) Date of Patent: Mar. 28, 2017

(54) SOLAR POWER GENERATION APPARATUS WITH NON-EQUIDIRECTIONAL SOLAR TRACKING STAGES

(71) Applicants: BIG SUN ENERGY TECHNOLOGY INCORPORATION, Hsinchu County (TW); Chia Ching Luo, Hsinchu County (TW)

(72) Inventor: Chia Ching Luo, Hsinchu County (TW)

(73) Assignees: Bit Sun Energy Technology Incorporation, Hsinchu County (TW); Chia Ching Luo, Hsinchu County (TW)

( * ) Notice: Subject to any disclaimer, the term of this patent is extended or adjusted under 35 U.S.C. 154(b) by 75 days.

(21) Appl. No.: 14/806,981

(22) Filed: Jul. 23, 2015

(65) Prior Publication Data

US 2015/0326173 A1 Nov. 12, 2015

Related U.S. Application Data

(62) Division of application No. 13/853,189, filed on Mar. 29, 2013, now Pat. No. 9,123,848.

(30) Foreign Application Priority Data

May 4, 2012 (TW) .............................. 101116111 A
Jan. 23, 2013 (TW) ............................. 102102547 A

(51) Int. Cl.
*F24J 2/38* (2014.01)
*F24J 2/54* (2006.01)
*H01L 31/052* (2014.01)
*H01L 31/042* (2014.01)
*H02S 20/10* (2014.01)

(52) U.S. Cl.
CPC ............. *H02S 20/32* (2014.12); *F24J 2/5417* (2013.01); *H01L 31/052* (2013.01); *H02S 20/00* (2013.01); *H02S 20/10* (2014.12); *F24J 2002/5458* (2013.01); *F24J 2002/5489* (2013.01); *Y02E 10/47* (2013.01); *Y02E 10/50* (2013.01)

(58) Field of Classification Search
CPC  F24J 2/38; F24J 2/06; F24J 2002/0084; F24J 2/40; F24J 2002/5468; F24J 2/10
USPC ............................................... 250/203.4, 221
See application file for complete search history.

(56) References Cited

U.S. PATENT DOCUMENTS

2015/0377518 A1* 12/2015 Maxey ...................... F24J 2/38
126/714

* cited by examiner

*Primary Examiner* — Que T Le
(74) *Attorney, Agent, or Firm* — Rosenberg, Klein & Lee

(57) ABSTRACT

A solar power generation apparatus with non-equidirectional solar tracking stages. At the beginning of sunrise, a solar power generation module is driven by a link assembly to gradually rotate from an initial position to the sun in a direction reverse to the moving direction of the sun. After the solar power generation module is rotated to a position of first preset elevation and azimuth, where the solar power generation module right faces the sun, the solar power generation module starts pivotally rotating along with the change of the position of the sun. When the sun and the direction of the solar power generation module synchronously move to a position of second preset elevation and azimuth, the solar power generation module is further driven to gradually pivotally rotate back to the initial position in a direction reverse to the moving direction of the sun for next cycle.

24 Claims, 5 Drawing Sheets

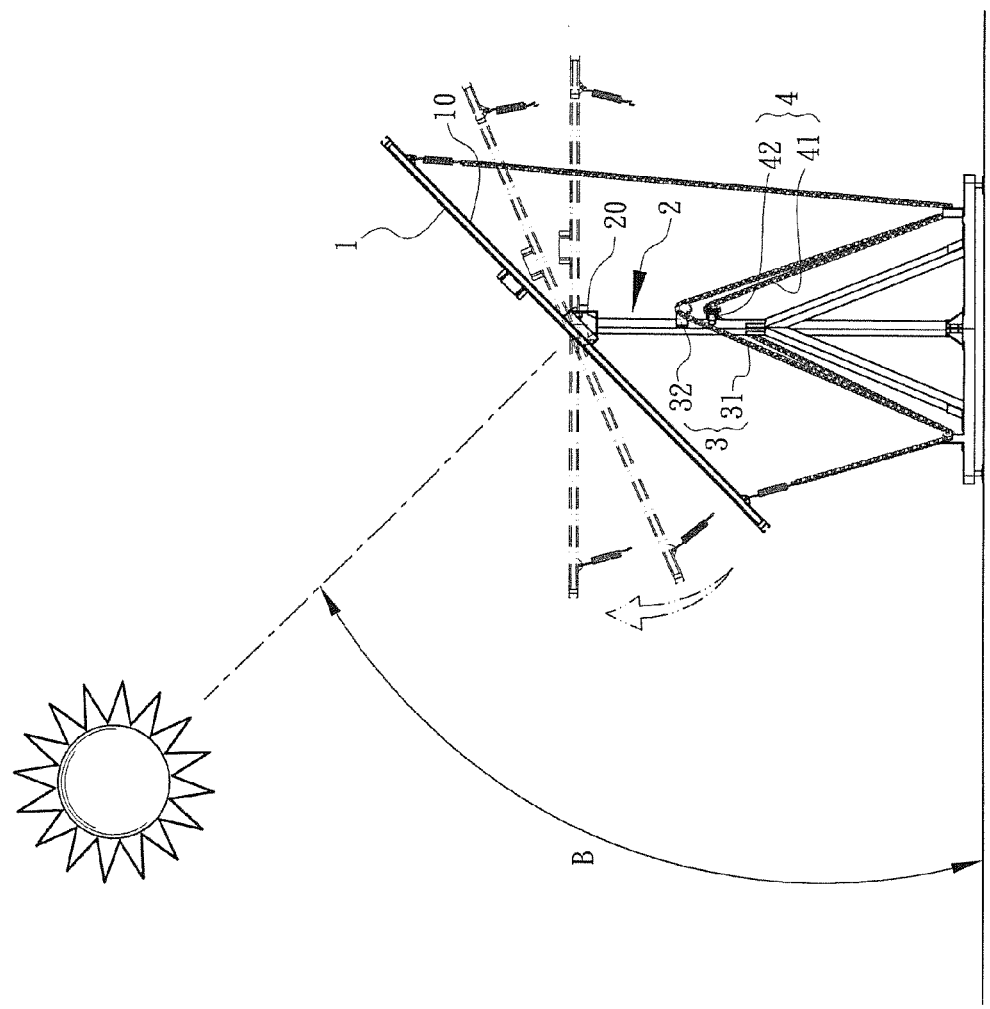
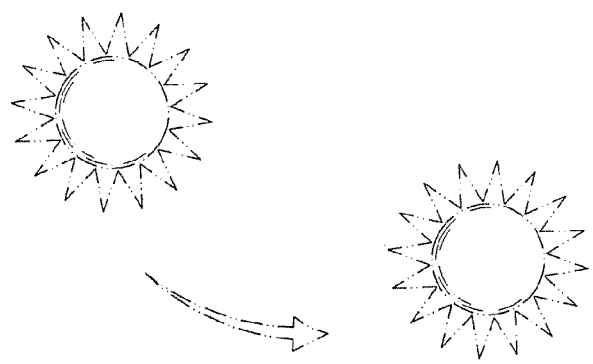
Fig.5

SOLAR POWER GENERATION APPARATUS WITH NON-EQUIDIRECTIONAL SOLAR TRACKING STAGES

REFERENCE TO RELATED APPLICATION

This application is being filed as a Divisional application of patent application Ser. No. 13/853,189, filed 29 Mar. 2013, currently pending.

BACKGROUND OF THE INVENTION

1. Field of the Invention

The present invention relates generally to a solar power generation apparatus with non-equidirectional solar tracking stages, and more particularly to a solar power generation apparatus, which can more effectively collect the solar energy at the stage of beginning of sunrise or the stage of sunset. Moreover, at the sunrise or sunset stage, the solar power generation apparatus can avoid the problem of shading of sunlight between the solar power generation modules.

2. Description of the Related Art

Along with the advance of various control and operation techniques, the solar power generation system has been gradually developed and converted from the traditional fixed-angle solar power generation apparatus (solar panel) into the solar tracking and synchronously rotational solar power generation system. Such solar power generation apparatus (solar panel) can keep facing the sun to enhance the solar energy absorption efficiency and thus increase power generation efficiency.

However, in order to achieve high-efficiency operation in a limited deployment space, the solar power generation apparatus (solar panel) is generally densely side by side arranged in adjacency to each other so as to increase the number of the solar power generation apparatus. At the stage of beginning of sunrise or the stage of sunset (the angle contained between the sun and the ground is smaller), the solar power generation apparatus (solar panel or solar tracking platform) is previously rotated to an angular position where the solar power generation apparatus is nearly normal to the horizon to face the sun so as to increase the solar energy absorption efficiency. Under such circumstance, the front row of solar power generation apparatus (solar panel or solar tracking platform) will directly shade the rearward solar power generation apparatus. This will seriously affect the solar energy absorption function of the rearward solar power generation apparatus (solar panel) behind the front row.

Moreover, the solar power generation apparatus is generally disposed in an open space (without shading the sunlight). Therefore, the solar power generation apparatus (solar panel) is subject to blowing of strong wind due to air convection. The existent solar power generation apparatus generally has a considerably large area and the strong wind is often a lateral wind. Accordingly, in the case that the inclination of the solar power generation apparatus (solar panel) is too large, that is, the solar power generation apparatus (solar panel) is nearly normal to the ground, the wind resistance area will be increased. Under such circumstance, the solar power generation apparatus (solar panel) will bear greater wind resistance. As a result, the solar power generation apparatus (solar panel) is very likely to be seriously damaged by the strong wind.

Therefore, in the current solar tracking power generation apparatus, before the solar tracking cycle starts, the solar tracking platform of the solar power generation apparatus is generally previously operated from a rest position to a start azimuth and elevation of the solar tracking cycle path. Only after the azimuth and elevation of the sun conform to the start azimuth and elevation, the solar tracking platform will follow the track of the sun to start the solar tracking cycle. After the solar tracking platform moves to a predetermined terminal of the solar tracking path, the solar tracking platform stops tracking the sun. After the sun completely sinks, the solar power generation apparatus is operated back to the rest position. Accordingly, at the sunrise and sunset stages, the rearward solar power generation apparatus will be shaded by the forward solar power generation apparatus. This will seriously deteriorate the solar energy absorption efficiency of the rearward solar power generation apparatus.

It is therefore tried by the applicant to provide a solar power generation apparatus with non-equidirectional solar tracking stages. During the solar tracking and synchronous rotation process of the solar power generation apparatus (solar panel), the solar power generation apparatus can avoid the problem of shading of sunlight between the respective solar power generation apparatuses (solar panels). In addition, the solar power generation apparatus can effectively collect the solar energy in the sunrise or sunset (the angle contained between the sun and the ground is smaller).

SUMMARY OF THE INVENTION

It is therefore a primary object of the present invention to provide a solar power generation apparatus with non-equidirectional solar tracking stages. In the solar power generation method with non-equidirectional solar tracking stages of the present invention, at the stage of beginning of sunrise or the stage of sunset (the angle contained between the sun and the ground is smaller), the solar power generation module is pivotally rotated and tilted in a direction reverse to the moving direction of the sun. In this case, the problem of shading of sunlight between the respective solar power generation modules can be avoided so that the solar power generation modules can more effectively collect the solar energy to increase the total power generation efficiency.

It is a further object of the present invention to provide the above solar power generation apparatus with non-equidirectional solar tracking stages, in which when the solar power generation module is moved to the final solar energy collection position, the carrier platform is just driven back to the initial (horizontal) position or rest position. Therefore, it is unnecessary to consume additional energy for operating the carrier platform to the rest position. Moreover, the solar power generation module is protected from damage of the lateral strong wind.

To achieve the above and other objects, the technical means of the solar power generation apparatus with non-equidirectional solar tracking stages of the present invention includes: when it is judged that the sun has risen, according to the extent to which the sun rises, using at least one link assembly to drive a solar power generation module to gradually slowly pivotally rotate from an initial rest position (generally a horizontal position) to the position of the rising sun by an angle of the elevation of the sun; judging whether the solar power generation module right faces the sun in a position of first preset elevation and azimuth; gradually pivotally rotating the solar power generation module from the position of the first preset elevation and azimuth along with the change of the position of the sun to adjust the elevation and azimuth of the solar power generation module, when it is ensured that the solar power generation module right faces the sun in a position of first preset elevation and azimuth, the link assembly driving the solar power generation module to gradually pivotally rotate along with the change of the position of the sun so as to keep facing the sun corresponding to the elevation and azimuth of the sun; judging whether the sun and the solar power generation module have synchronously moved to a position of second preset elevation and azimuth; and making the solar power generation module stop pivotally rotating and stop tracking the sun and gradually pivotally rotate back toward the initial position in a direction reverse to the moving direction of the sun, in the case that it is ensured that the sun and the solar power generation module have synchronously moved to a position of second preset elevation and azimuth, the link assembly driving the solar power generation module to stop tracking the sun in the same direction and making the solar power generation module slowly reversely pivotally rotate back toward the initial position according to the extent to which the sun gradually sets.

The above solar power generation apparatus with non-equidirectional solar tracking stages further includes a step of judging whether the sun has completely sunk and a step of making the solar power generation module restore to the initial position after the step of making the solar power generation module stop pivotally rotating and stop tracking the sun and gradually pivotally rotate back toward the initial position in a direction reverse to the moving direction of the sun. Preferably, after the sun completely sinks, the solar power generation module is controlled to just or nearly restore to the initial rest position.

The above solar power generation apparatus with non-equidirectional solar tracking stages further includes a step of judging whether the sun has risen to move in a preset path before the step of making a solar power generation module gradually pivotally rotate from an initial position to the position of the sun in a direction reverse to the moving direction of the sun. In this step, it is judged whether the sun has risen to move in a preset path.

In the above solar power generation apparatus with non-equidirectional solar tracking stages, the initial position is a horizontal position.

In the above solar power generation apparatus with non-equidirectional solar tracking stages, the first preset elevation is equal to the second preset elevation.

The present invention can be best understood through the following description and accompanying drawings, wherein:

BRIEF DESCRIPTION OF THE DRAWINGS

FIG. 5 is a view showing the operation of the present invention according to FIG. 1 in a fourth stage.

DETAILED DESCRIPTION OF THE PREFERRED EMBODIMENTS

Figure 1:
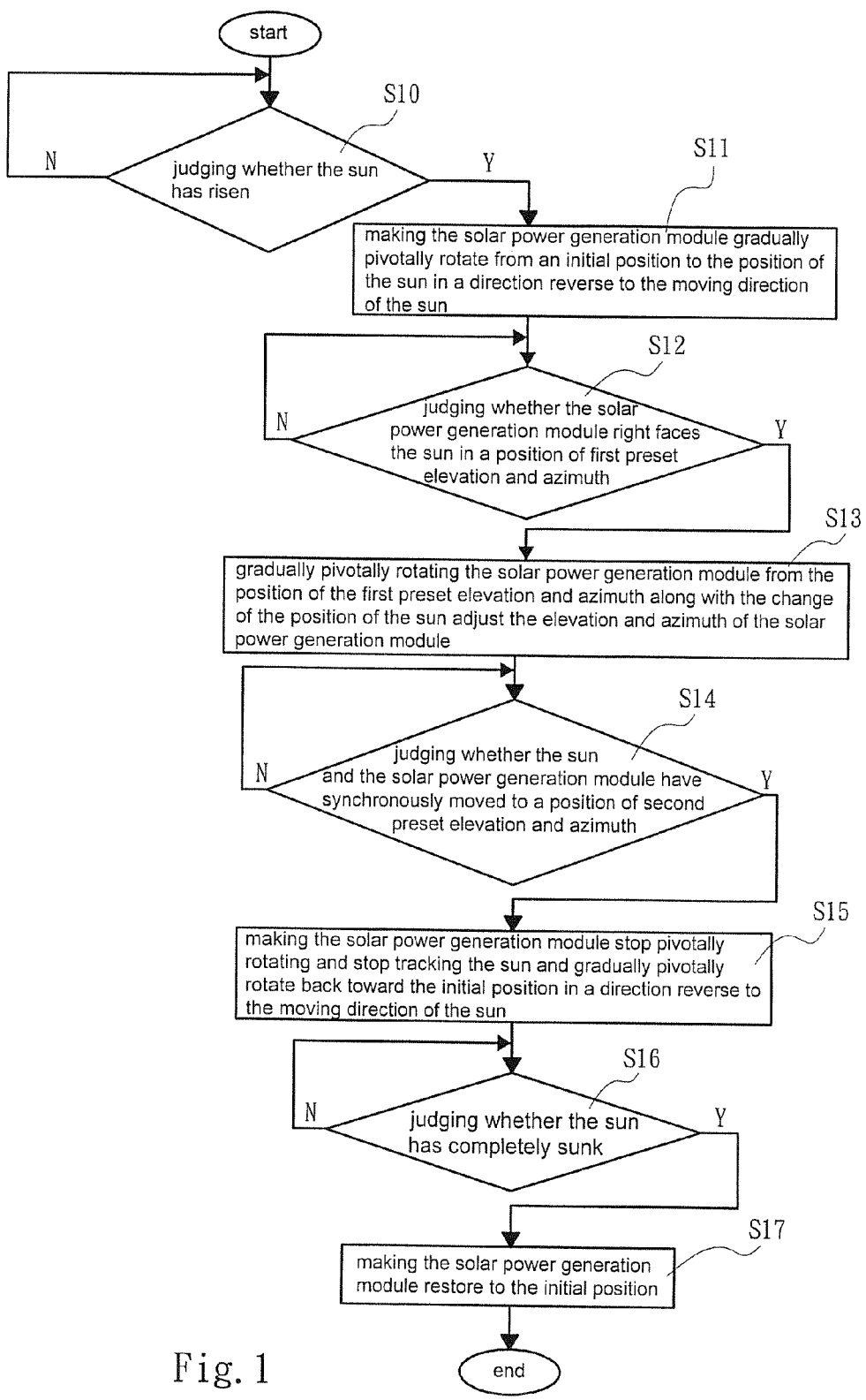
FIG. 1 is a flow chart of the operation procedure of the solar power generation apparatus with non-equidirectional solar tracking stages of the present invention.

Please refer to FIG. 1, which is a flow chart of the operation procedure of the solar power generation apparatus with non-equidirectional solar tracking stages of the present invention. The operation procedure of the solar power generation apparatus of the present invention includes steps of:

S10. judging whether the sun has risen to move in a preset path;

S11. making the solar power generation module gradually pivotally rotate from an initial position to the position of the sun in a direction reverse to the moving direction of the sun;

S12. judging whether the solar power generation module right faces the sun in a position of first preset elevation and azimuth;

S13. gradually pivotally rotating the solar power generation module from the position of the first preset elevation and azimuth along with the change of the position of the sun to adjust the elevation and azimuth of the solar power generation module;

S14. judging whether the sun and the solar power generation module have synchronously moved to a position of second preset elevation and azimuth;

S15. making the solar power generation module stop pivotally rotating and stop tracking the sun and gradually pivotally rotate back toward the initial position in a direction reverse to the moving direction of the sun;

S16. judging whether the sun has completely sunk; and

S17. making the solar power generation module restore to the initial position.

Please now refer to FIGS. 2 to 5. In practice, a solar power generation module 1 disposed on a support assembly 2 is used in the above method. (The solar power generation module 1 is connected on a carrier platform 10, which is connected to the support assembly 2 through a two-dimensional pivotal rotation assembly 20). Two link assemblies 3, 4 controlled by a control device are disposed between the support assembly 2 and the solar power generation module 1. Each of the link assemblies 3, 4 has a power source 31, 41 and a connection member 32, 42 drivable by the power source 31, 41. Two end sections of the connection member 32, 42 are respectively connected to different edges of the carrier platform 10. Accordingly, respectively via the connection members 32, 42, the power sources 31, 41 can drive the carrier platform 10 and the solar power generation module 1 to pivotally rotate and tilt. The structure of the above apparatus will be respectively described hereinafter in accordance with the above steps.

Figure 2:
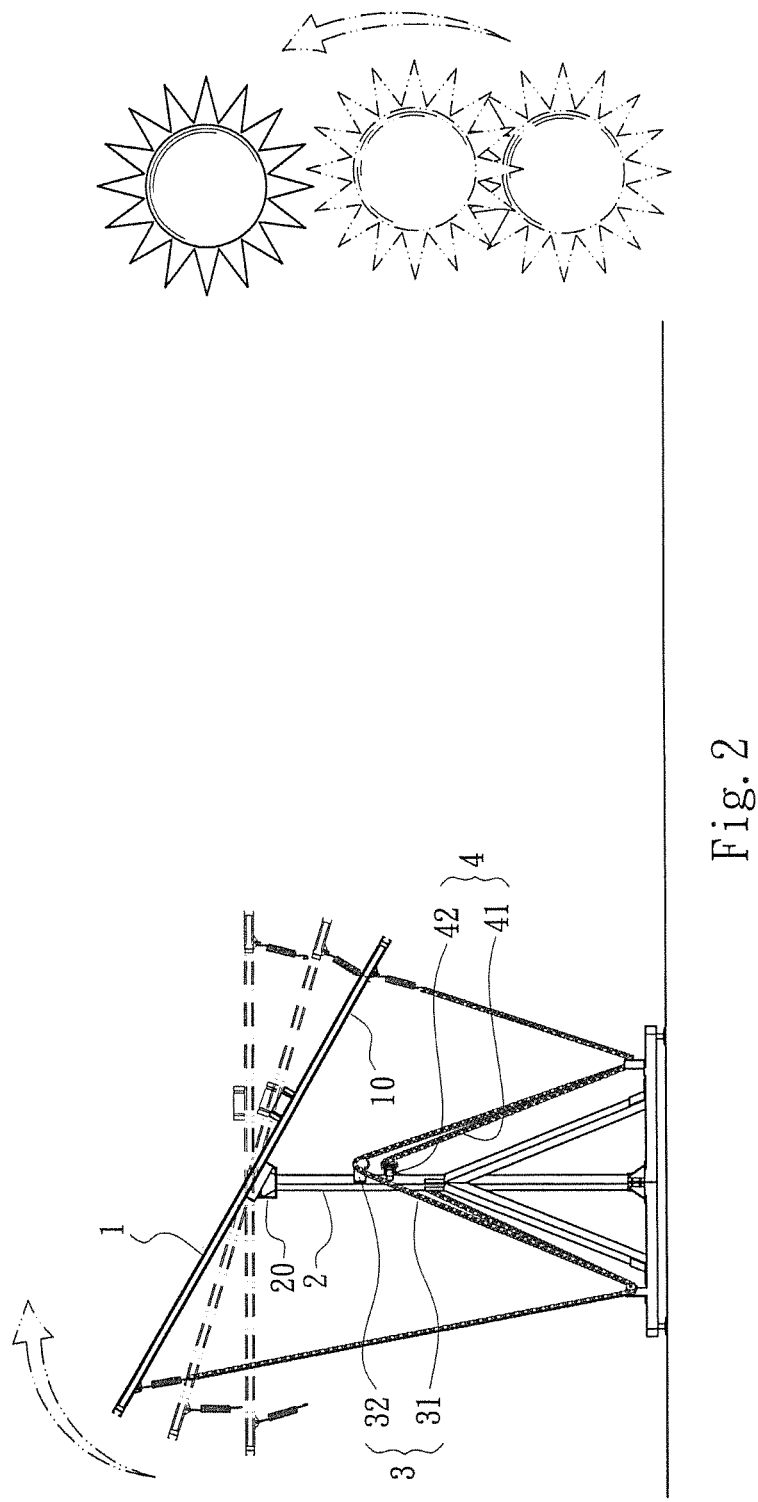
FIG. 2 is a view showing the operation of the present invention according to FIG. 1 in a first stage.
Figure 3:
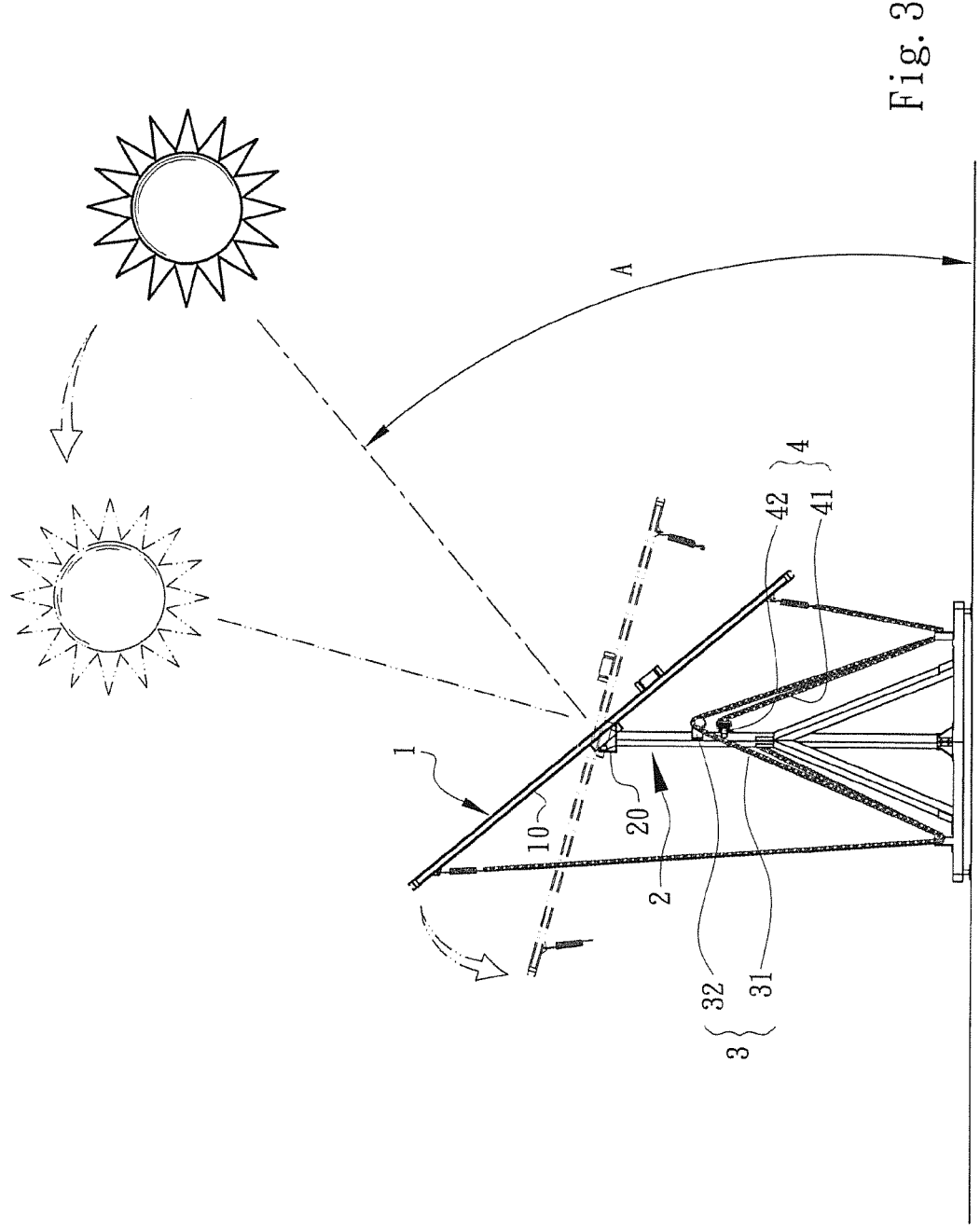
FIG. 3 is a view showing the operation of the present invention according to FIG. 1 in a second stage.
Figure 4:
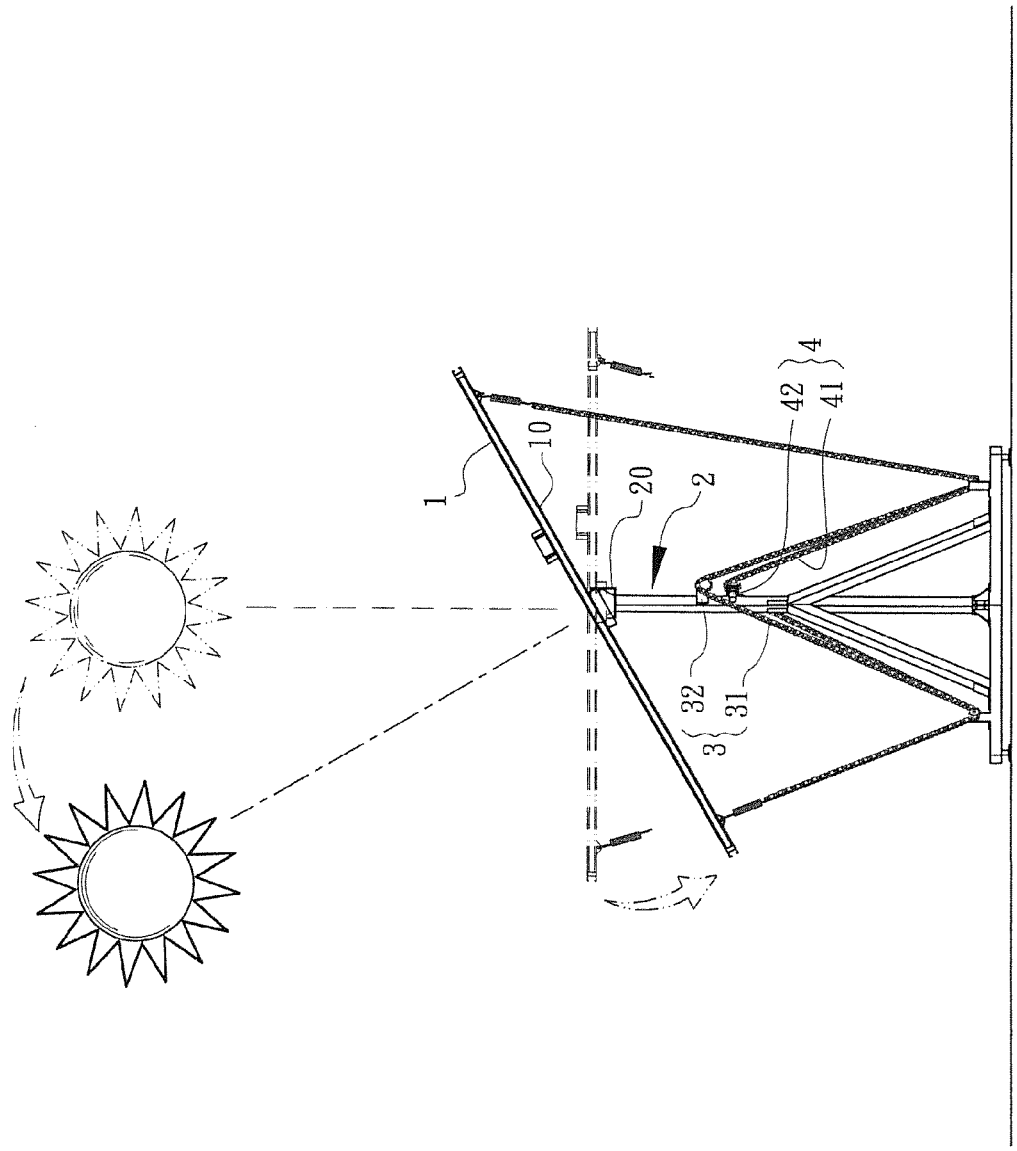
FIG. 4 is a view showing the operation of the present invention according to FIG. 1 in a third stage.

First, in step S10 of judging whether the sun has risen to move in a preset path, a photosensor can be used to detect whether the environmental light intensity is greater than a preset value so as to judge whether the sun has risen. (Alternatively, the moving track of the sun can be calculated according to the formula of moving track of the sun to ensure that the sun has risen to move in its moving track). If so "Y", then the procedure goes to step S11 of making the solar power generation module gradually pivotally rotate from an initial position to the position of the sun in a direction reverse to the moving direction of the sun. In this step, according to the extent to which the sun rises, the two link assemblies 3, 4 respectively drive the solar power generation module 1 (carrier platform 10) to gradually pivotally rotate from an initial position (generally a horizontal position) to the position of the sun in a direction reverse to the moving direction of the sun (as shown in FIG. 2). Then, in step S12 of judging whether the solar power generation module right faces the sun in a position of first preset elevation and azimuth, it is judged whether the solar power generation module 1 (carrier platform 10) has moved to the position of first preset elevation A and azimuth, where the solar power generation module 1 (carrier platform 10)

right faces the sun. If so "Y", then the procedure goes to step S13 of gradually pivotally rotating the solar power generation module from the position of the first preset elevation A and azimuth along with the change of the position of the sun to adjust the elevation and azimuth of the solar power generation module. In this step, the two link assemblies 3, 4 drive the solar power generation module 1 (carrier platform 10) to gradually pivotally rotate along with the change of the position of the sun so as to keep facing the sun corresponding to the elevation and azimuth of the sun (as shown in FIG. 3). Then, in step S14 of judging whether the sun and the solar power generation module have synchronously moved to a position of second preset elevation and azimuth, it is judged whether the sun and the solar power generation module 1 (carrier platform 10) have synchronously moved to a position of second preset elevation B and azimuth, where the dynamic adjustment (solar tracking) is ended (as shown in FIG. 4). If so then the procedure goes to step S15 of making the solar power generation module stop pivotally rotating and stop tracking the sun and gradually pivotally rotate back toward the initial position in a direction reverse to the moving direction of the sun. In this step, according to the extent to which the sun sets, the two link assemblies 3, 4 make the solar power generation module 1 (carrier platform 10) stop tracking the sun and make the solar power generation module 1 (carrier platform 10) gradually slowly pivotally rotate back toward the initial rest position in a reverse direction. Alternatively, the solar power generation module 1 (carrier platform 10) can restore to the initial position by means of its own restoring force. Finally, after the step S16 of judging whether the sun has completely sunk, if so, in step S17 of making the solar power generation module restore to the initial position, the solar power generation module 1 (carrier platform 10) is just or nearly restored to the initial horizontal position and becomes stationary (as shown in FIG. 5). A photosensor can be used to detect whether the environmental light intensity is less than a preset value so as to judge whether the sun has sunk. Alternatively, this can be calculated according to the formula of moving track of the sun.

It is known that the sun has different moving tracks in different latitudes on the earth at different times of the year. The elevation and azimuth of the solar power generation module 1 (carrier platform 10) corresponding to the moving track of the sun can be simulated and calculated according to the formula. Therefore, in the practical operation of the present invention, the calculation formula can be previously stored in a control module for controlling the two link assemblies 3, 4. In use, a user only needs to input the necessary information such as the latitude of the district and the date for making the link assemblies 3, 4 automatically drive the solar power generation module 1 (carrier platform 10) at proper time. This facilitates the operation of the present invention.

In conclusion, in the solar power generation apparatus with non-equidirectional solar tracking stages of the present invention, at the sunrise or sunset stage, the solar power generation apparatus is pivotally rotated and tilted in a direction reverse to the moving direction of the sun. In this case, the problem of shading of sunlight between the respective solar power generation modules can be avoided so as to more effectively collect the solar energy and thus increase the power generation efficiency.

The above embodiments are only used to illustrate the present invention, not intended to limit the scope thereof. Many modifications of the above embodiments can be made without departing from the spirit of the present invention.

What is claimed is:

1. A solar power generation apparatus with non-equidirectional solar tracking stages, comprising a support assembly, a solar power generation module mounted on the support assembly and a link assembly disposed between the support assembly and the solar power generation module and controlled by a control device, when it is judged that the sun has risen, according to the extent to which the sun rises, the control device via the link assembly driving the support assembly to make the solar power generation module slowly pivotally rotate from an initial position to the direction of the sun in a direction reverse to the moving direction of the sun to face the sun in a position of a first preset elevation and azimuth.

2. The solar power generation apparatus with non-equidirectional solar tracking stages as claimed in claim 1, wherein the support assembly includes at least one carrier platform, the solar power generation module being mounted on the carrier platform.

3. The solar power generation apparatus with non-equidirectional solar tracking stages as claimed in claim 2, wherein the link assembly is composed of a power source and a connection member drivable by the power source, the connection member having two ends, which are respectively connected to different edges of the carrier platform.

4. The solar power generation apparatus with non-equidirectional solar tracking stages as claimed in claim 1, wherein after the control device via the link assembly drives the support assembly to make the solar power generation module rotate to face the sun in the position of the first preset elevation and azimuth of the sun, the solar power generation module immediately starts to first gradually pivotally rotate along with the change of the direction of the sun to synchronously track the sun.

5. The solar power generation apparatus with non-equidirectional solar tracking stages as claimed in claim 2, wherein after the control device via the link assembly drives the support assembly to make the solar power generation module rotate to face the sun in the position of the first preset elevation and azimuth of the sun, the solar power generation module immediately starts to first gradually pivotally rotate along with the change of the direction of the sun to synchronously track the sun.

6. The solar power generation apparatus with non-equidirectional solar tracking stages as claimed in claim 3, wherein after the control device via the link assembly drives the support assembly to make the solar power generation module rotate to face the sun in the position of the first preset elevation and azimuth of the sun, the solar power generation module immediately starts to first gradually pivotally rotate along with the change of the direction of the sun to synchronously track the sun.

7. The solar power generation apparatus with non-equidirectional solar tracking stages as claimed in claim 4, wherein when the control device via the link assembly drives the support assembly to make the solar power generation module rotate to a position of a second preset elevation and azimuth of the sun nearly before the sun sets, the solar power generation module immediately starts an operation mode in which the solar power generation module stops tracking the sun along with the direction of the sun.

8. The solar power generation apparatus with non-equidirectional solar tracking stages as claimed in claim 5, wherein when the control device via the link assembly drives the support assembly to make the solar power generation module rotate to a position of a second preset elevation and azimuth of the sun nearly before the sun sets, the solar power generation module immediately starts an operation mode in which the solar power generation module stops tracking the sun along with the direction of the sun.

9. The solar power generation apparatus with non-equidirectional solar tracking stages as claimed in claim 6, wherein when the control device via the link assembly drives the support assembly to make the solar power generation module rotate to a position of a second preset elevation and azimuth of the sun nearly before the sun sets, the solar power generation module immediately starts an operation mode in which the solar power generation module stops tracking the sun along with the direction of the sun.

10. The solar power generation apparatus with non-equidirectional solar tracking stages as claimed in claim 7, wherein the operation mode in which the control device stops tracking the sun along with the direction of the sun further includes a mode in which according to the extent to which the sun sets, the solar power generation module slowly pivotally rotates to the initial position in a direction reverse to the moving direction of the sun.

11. The solar power generation apparatus with non-equidirectional solar tracking stages as claimed in claim 8, wherein the operation mode in which the control device stops tracking the sun along with the direction of the sun further includes a mode in which according to the extent to which the sun sets, the solar power generation module slowly pivotally rotates to the initial position in a direction reverse to the moving direction of the sun.

12. The solar power generation apparatus with non-equidirectional solar tracking stages as claimed in claim 9, wherein the operation mode in which the control device stops tracking the sun along with the direction of the sun further includes a mode in which according to the extent to which the sun sets, the solar power generation module slowly pivotally rotates to the initial position in a direction reverse to the moving direction of the sun.

13. The solar power generation apparatus with non-equidirectional solar tracking stages as claimed in claim 1, wherein the initial position is a position where the solar power generation module is horizontally positioned.

14. The solar power generation apparatus with non-equidirectional solar tracking stages as claimed in claim 2, wherein the initial position is a position where the solar power generation module is horizontally positioned.

15. The solar power generation apparatus with non-equidirectional solar tracking stages as claimed in claim 3, wherein the initial position is a position where the solar power generation module is horizontally positioned.

16. The solar power generation apparatus with non-equidirectional solar tracking stages as claimed in claim 4, wherein the initial position is a position where the solar power generation module is horizontally positioned.

17. The solar power generation apparatus with non-equidirectional solar tracking stages as claimed in claim 5, wherein the initial position is a position where the solar power generation module is horizontally positioned.

18. The solar power generation apparatus with non-equidirectional solar tracking stages as claimed in claim 6, wherein the initial position is a position where the solar power generation module is horizontally positioned.

19. The solar power generation apparatus with non-equidirectional solar tracking stages as claimed in claim 7, wherein the initial position is a position where the solar power generation module is horizontally positioned.

20. The solar power generation apparatus with non-equidirectional solar tracking stages as claimed in claim 8, wherein the initial position is a position where the solar power generation module is horizontally positioned.

21. The solar power generation apparatus with non-equidirectional solar tracking stages as claimed in claim 9, wherein the initial position is a position where the solar power generation module is horizontally positioned.

22. The solar power generation apparatus with non-equidirectional solar tracking stages as claimed in claim 10, wherein the initial position is a position where the solar power generation module is horizontally positioned.

23. The solar power generation apparatus with non-equidirectional solar tracking stages as claimed in claim 11, wherein the initial position is a position where the solar power generation module is horizontally positioned.

24. The solar power generation apparatus with non-equidirectional solar tracking stages as claimed in claim 12, wherein the initial position is a position where the solar power generation module is horizontally positioned.

* * * * *